United States Patent
Pender

(10) Patent No.: US 9,424,412 B1
(45) Date of Patent: Aug. 23, 2016

(54) AUTHENTICATING CUSTOMERS USING BIOMETRICS

(71) Applicant: Bank of America Corporation, Charlotte, NC (US)

(72) Inventor: Mark A. Pender, Rockville Center, NY (US)

(73) Assignee: Bank of America Corporation, Charlotte, NC (US)

( * ) Notice: Subject to any disclaimer, the term of this patent is extended or adjusted under 35 U.S.C. 154(b) by 37 days.

(21) Appl. No.: 14/611,479

(22) Filed: Feb. 2, 2015

(51) Int. Cl.
*G05B 19/00* (2006.01)
*G06F 21/32* (2013.01)
*H04W 12/06* (2009.01)

(52) U.S. Cl.
CPC .............. *G06F 21/32* (2013.01); *H04W 12/06* (2013.01)

(58) Field of Classification Search
CPC .............................. G06F 21/32; H04W 12/06
USPC ......................................................... 340/5.82
See application file for complete search history.

(56) References Cited

U.S. PATENT DOCUMENTS

| | | | |
|---|---|---|---|
| 8,189,878 B2 | 5/2012 | Schultz | |
| 8,553,870 B2 | 10/2013 | Turcan et al. | |
| 2013/0110654 A1* | 5/2013 | Kobres | G06Q 20/204 705/16 |
| 2013/0219480 A1 | 8/2013 | Bud | |
| 2013/0346309 A1 | 12/2013 | Giori | |
| 2013/0347129 A1 | 12/2013 | Samuelsson et al. | |
| 2014/0040138 A1 | 2/2014 | Henry | |
| 2014/0058950 A1 | 2/2014 | Gupta | |
| 2014/0074717 A1 | 3/2014 | Evans | |
| 2014/0122331 A1 | 5/2014 | Vaish et al. | |
| 2014/0129440 A1 | 5/2014 | Smith et al. | |
| 2014/0137199 A1 | 5/2014 | Hefetz | |
| 2014/0143089 A1 | 5/2014 | Campos et al. | |

(Continued)

FOREIGN PATENT DOCUMENTS

CN 103634285 A * 3/2014

OTHER PUBLICATIONS

"Encap Security intergrates Apple's Touch ID fingerprint recognition into its authentication platform," New Vision (Uganda), TMC News, Oct. 27, 2014, retrieved from <http://www.tmcnet.com/usubmit/2014/10/27/8087619.htm> , 3 pages.

*Primary Examiner* — Juan A Torres
(74) *Attorney, Agent, or Firm* — Banner & Witcoff, Ltd.; Michael A. Springs

(57) ABSTRACT

Methods, systems, and computer-readable media for authenticating customers using biometrics are presented. In some embodiments, a computing platform may receive, from an interactive voice response server, an inbound call notification associated with a telephone call received from a mobile device. Subsequently, the computing platform may determine a device identifier of the mobile device and a customer identifier corresponding to a user of the mobile device. The computing platform then may load a customer authentication profile. Subsequently, the computing platform may generate a biometric authentication prompt for authenticating the user of the mobile device and may cause the biometric authentication prompt to be sent to the mobile device. Thereafter, the computing platform may receive, from the mobile device, a validation message. In response to receiving the validation message, the computing platform may generate an authentication message. Subsequently, the computing platform may send the authentication message to the interactive voice response server.

20 Claims, 13 Drawing Sheets

(56) References Cited

U.S. PATENT DOCUMENTS

| | | |
|---|---|---|
| 2014/0164254 A1 | 6/2014 | Dimmick |
| 2014/0172715 A1 | 6/2014 | Gupta |
| 2014/0172724 A1 | 6/2014 | Dua |
| 2014/0195425 A1 | 7/2014 | Campos et al. |
| 2014/0213220 A1 | 7/2014 | Huber et al. |
| 2014/0222674 A1 | 8/2014 | Smith et al. |
| 2014/0222682 A1 | 8/2014 | Dua |
| 2014/0235201 A1 | 8/2014 | Gurajala et al. |
| 2014/0236817 A1 | 8/2014 | Meyer et al. |
| 2014/0244509 A1 | 8/2014 | Henry |
| 2014/0247926 A1 | 9/2014 | Gainsboro et al. |
| 2014/0250512 A1 | 9/2014 | Goldstone et al. |
| 2014/0297438 A1 | 10/2014 | Dua |
| 2014/0297528 A1 | 10/2014 | Agrawal et al. |
| 2014/0337227 A1 | 11/2014 | Dua |
| 2014/0344149 A1 | 11/2014 | Campos |
| 2014/0376703 A1 | 12/2014 | Timem et al. |
| 2014/0379339 A1 | 12/2014 | Timem et al. |
| 2014/0379340 A1 | 12/2014 | Timem et al. |
| 2014/0379525 A1 | 12/2014 | Timem et al. |
| 2015/0019437 A1 | 1/2015 | Smith et al. |
| 2015/0287017 A1* | 10/2015 | Iqbal ............... G06Q 20/3223 705/44 |

* cited by examiner

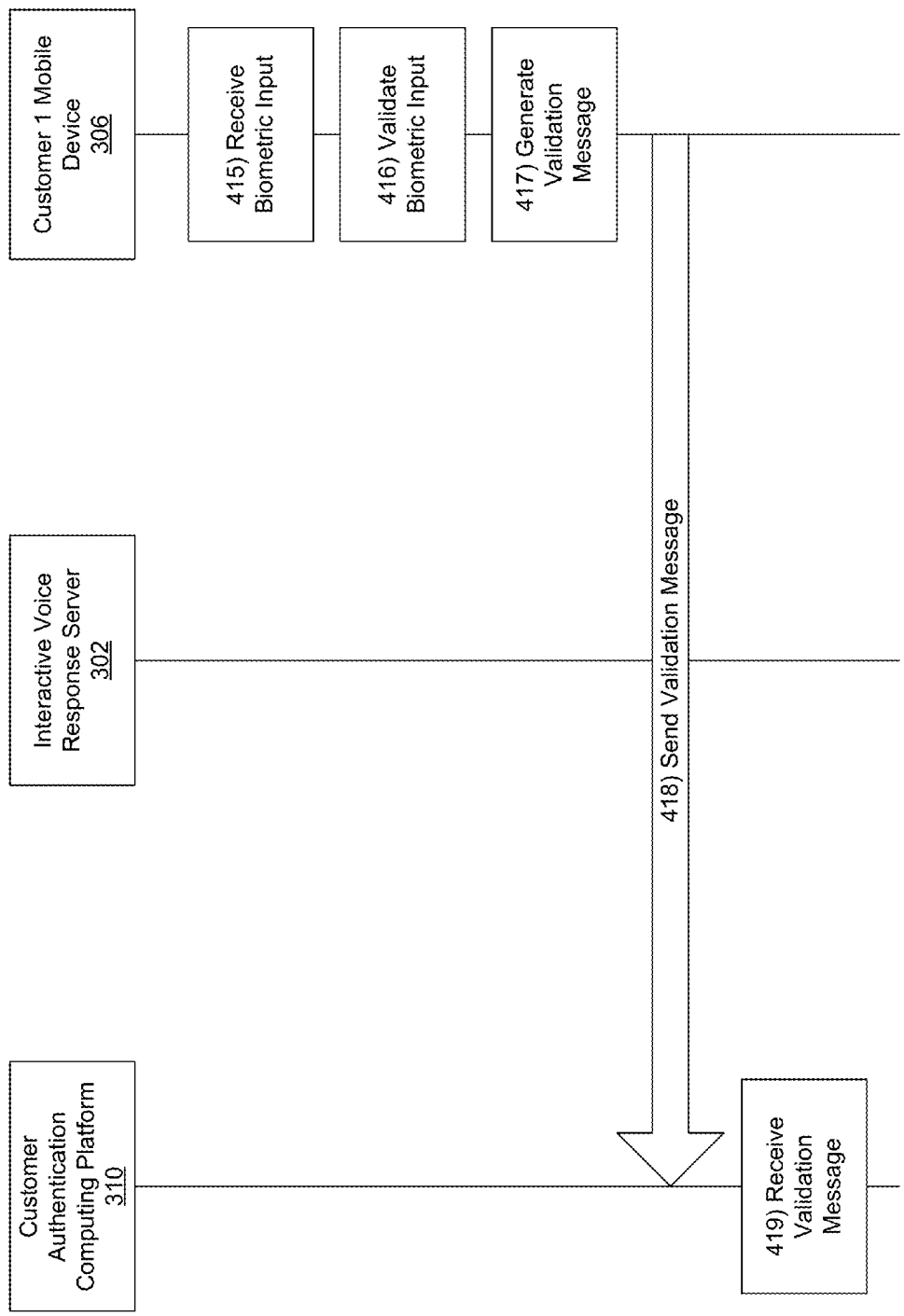

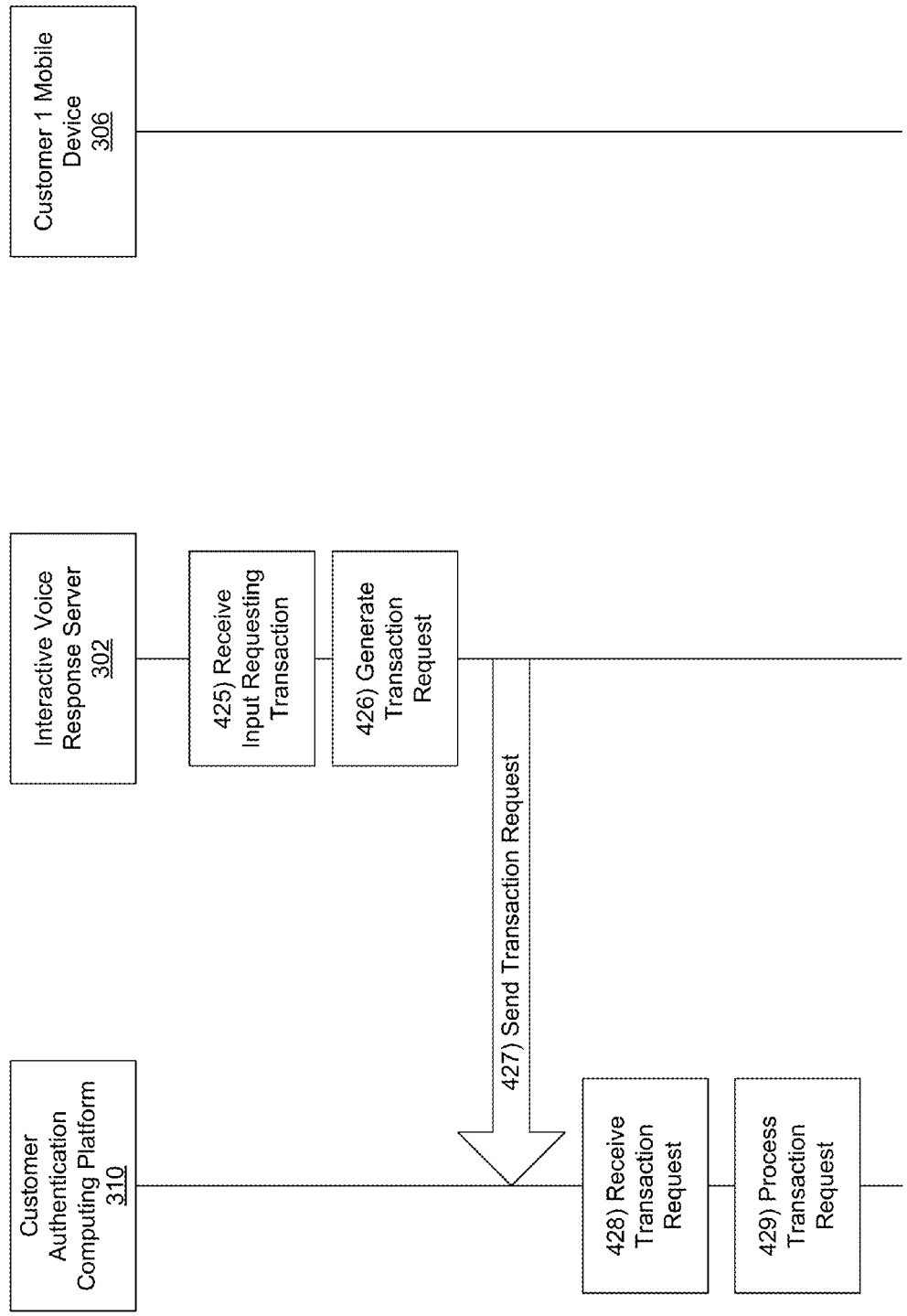

AUTHENTICATING CUSTOMERS USING BIOMETRICS

BACKGROUND

Aspects of the disclosure relate to computer hardware and software. In particular, one or more aspects of the disclosure generally relate to computer hardware and software for authenticating customers using biometrics.

Large organizations, such as financial institutions, may serve many customers, and increasingly, such organizations are providing different ways for customers to interact with the organizations about the products and/or services offered by these organizations, beyond traditional brick-and-mortar retail locations. For example, a financial institution may provide various channels that allow its customers to conveniently access account information, such as an online banking portal, a customer assistance telephone line, and/or other channels.

As customers continue to demand more effective, efficient, and convenient ways of interacting with organizations, ensuring the security of customer account information and other customer data, while still providing customers with the convenience and flexibility that they desire, is becoming increasingly important.

SUMMARY

Aspects of the disclosure relate to various systems and techniques that provide effective, efficient, scalable, and convenient ways of ensuring the security of customer account information and other customer data.

For example, some aspects of the disclosure provide ways of authenticating customers in various contexts, particularly in instances in which a customer of an organization is calling into a customer assistance telephone line (which may, e.g., provide automated service to the customer using an interactive voice response unit and/or which may connect the customer to a customer service representative for assistance) operated by the organization. In one or more arrangements, when a customer dials into a customer assistance telephone line from their smartphone or mobile device, an organization server may generate and send a push notification to the customer's mobile device that prompts the customer to provide biometric input, such as their fingerprint, for validation. If the customer's biometric input is validated, the customer's mobile device may send a notification back to the organization server indicating that the customer has been successfully authenticated using biometrics. Based on receiving this notification, the organization server may establish the customer's authentication status for their telephone session on the customer assistance telephone line. By establishing the customer's authentication status in this way, the customer might not need to be prompted to enter additional authentication credentials, such as a username and passcode, to access account information and/or other customer data, thus providing a more convenient experience to the customer. In addition, by implementing these and/or other aspects of the disclosure, enhanced information security also may be provided, as the initial push notification may be sent only to the customer's mobile device, which may be pre-registered with the organization to receive prompts to provide biometric input. In some instances, the customer might not otherwise be able to access account information via the customer assistance telephone line unless valid biometric input is provided via their pre-registered mobile device, thus further increasing the security of the customer's information. As illustrated in greater detail below, these features and/or others may provide more convenient and secure experiences for customers of an organization when interacting with the organization in various ways.

In accordance with one or more embodiments, a customer authentication computing platform having at least one processor, a memory, and a communication interface may receive, via the communication interface, and from an interactive voice response server, an inbound call notification associated with a telephone call received by the interactive voice response server from a mobile device. Subsequently, the customer authentication computing platform may determine a device identifier of the mobile device. Then, the customer authentication computing platform may determine a customer identifier corresponding to a user of the mobile device. The customer authentication computing platform then may load a customer authentication profile based on the customer identifier. Subsequently, the customer authentication computing platform may generate a biometric authentication prompt for authenticating the user of the mobile device, and the customer authentication computing platform may cause the biometric authentication prompt to be sent to the mobile device. Thereafter, the customer authentication computing platform may receive, via the communication interface, and from the mobile device, a validation message. In response to receiving the validation message, the customer authentication computing platform may generate an authentication message. Subsequently, the customer authentication computing platform may send, via the communication interface, and to the interactive voice response server, the authentication message.

In some embodiments, the customer identifier may identify the user of the mobile device as a customer of an organization operating the system.

In some embodiments, the customer authentication profile may include information indicating that the user of the mobile device has registered the mobile device to receive biometric authentication prompts. Additionally or alternatively, the customer authentication profile may include information indicating that the mobile device stores one or more predefined biometric credentials.

In some embodiments, causing the biometric authentication prompt to be sent to the mobile device may include causing a push notification service to send a push notification to the mobile device.

In some embodiments, the biometric authentication prompt may be configured to prompt the user of the mobile device to provide biometric input for verification by the mobile device. In some instances, the biometric input may include fingerprint biometric input.

In some embodiments, the validation message may indicate that the user of the mobile device has provided valid biometric input matching one or more predefined biometric credentials stored by the mobile device.

In some embodiments, the authentication message may establish an authentication status of the user of the mobile device. Additionally or alternatively, the authentication message may be configured to cause the interactive voice response server to provide the user of the mobile device with access to account information that is specific to the user of the mobile device.

In some embodiments, after sending the authentication message, the customer authentication computing platform may receive, via the communication interface, and from the interactive voice response server, a transaction request. Subsequently, the customer authentication computing platform may process the transaction request. In some instances, processing the transaction request may include causing one or more systems operated by a financial institution to execute a funds transfer transaction.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which:

FIGS. 4A-4G depict an illustrative event sequence for authenticating customers using biometrics in accordance with one or more example embodiments;

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

Figure 1:
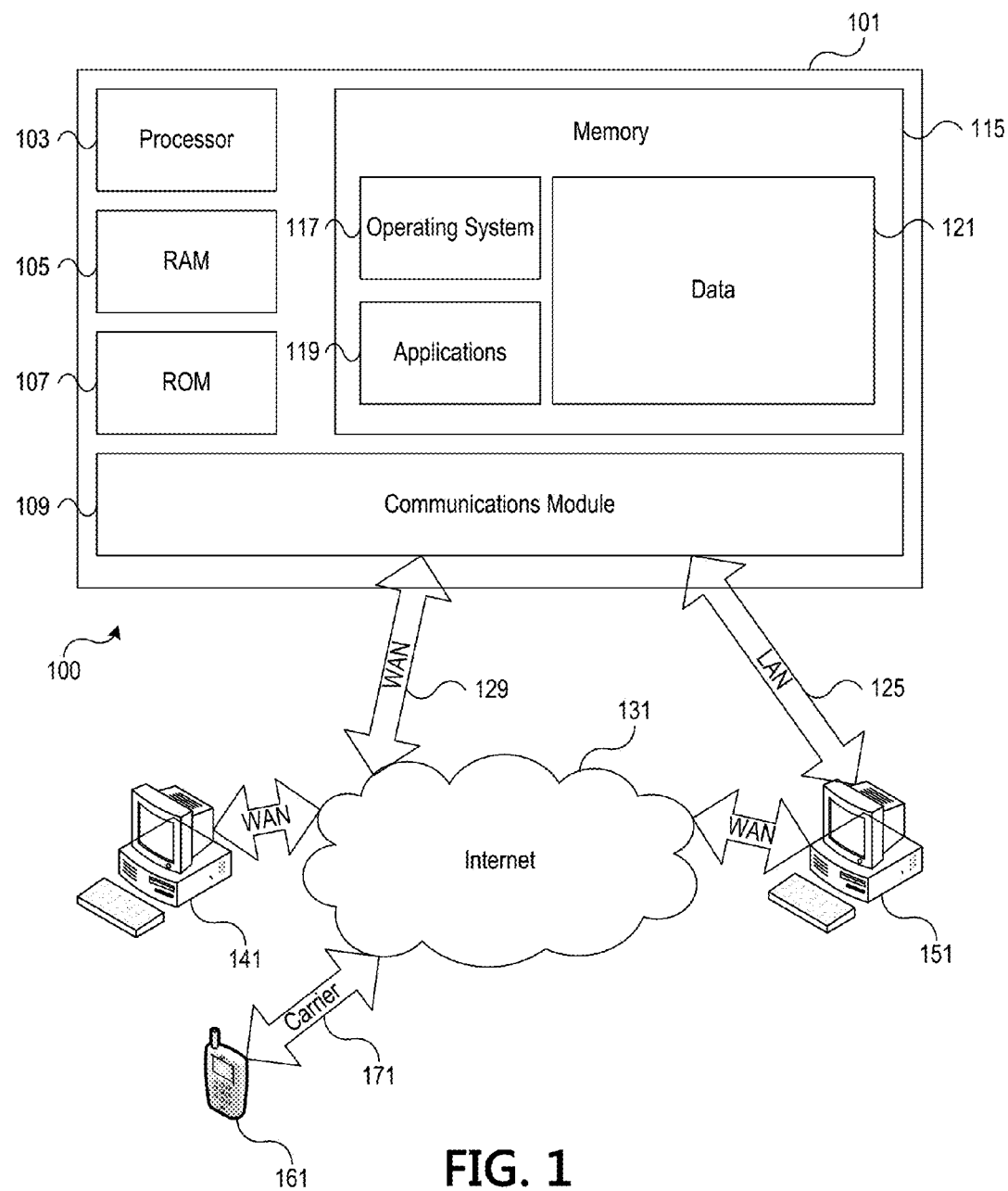
FIG. 1 depicts an illustrative operating environment in which various aspects of the disclosure may be implemented in accordance with one or more example embodiments.

FIG. 1 depicts an illustrative operating environment in which various aspects of the present disclosure may be implemented in accordance with one or more example embodiments. Referring to FIG. 1, computing system environment 100 may be used according to one or more illustrative embodiments. Computing system environment 100 is only one example of a suitable computing environment and is not intended to suggest any limitation as to the scope of use or functionality contained in the disclosure. Computing system environment 100 should not be interpreted as having any dependency or requirement relating to any one or combination of components shown in illustrative computing system environment 100.

Computing system environment 100 may include computing device 101 having processor 103 for controlling overall operation of computing device 101 and its associated components, including random-access memory (RAM) 105, read-only memory (ROM) 107, communications module 109, and memory 115. Computing device 101 may include a variety of computer readable media. Computer readable media may be any available media that may be accessed by computing device 101, may be non-transitory, and may include volatile and nonvolatile, removable and non-removable media implemented in any method or technology for storage of information such as computer-readable instructions, object code, data structures, program modules, or other data. Examples of computer readable media may include random access memory (RAM), read only memory (ROM), electronically erasable programmable read only memory (EEPROM), flash memory or other memory technology, compact disk read-only memory (CD-ROM), digital versatile disks (DVD) or other optical disk storage, magnetic cassettes, magnetic tape, magnetic disk storage or other magnetic storage devices, or any other medium that can be used to store the desired information and that can be accessed by computing device 101.

Although not required, various aspects described herein may be embodied as a method, a data processing system, or as a computer-readable medium storing computer-executable instructions. For example, a computer-readable medium storing instructions to cause a processor to perform steps of a method in accordance with aspects of the disclosed embodiments is contemplated. For example, aspects of the method steps disclosed herein may be executed on a processor on computing device 101. Such a processor may execute computer-executable instructions stored on a computer-readable medium.

Software may be stored within memory 115 and/or storage to provide instructions to processor 103 for enabling computing device 101 to perform various functions. For example, memory 115 may store software used by computing device 101, such as operating system 117, application programs 119, and associated database 121. Also, some or all of the computer executable instructions for computing device 101 may be embodied in hardware or firmware. Although not shown, RAM 105 may include one or more applications representing the application data stored in RAM 105 while computing device 101 is on and corresponding software applications (e.g., software tasks) are running on computing device 101.

Communications module 109 may include a microphone, keypad, touch screen, and/or stylus through which a user of computing device 101 may provide input, and may also include one or more of a speaker for providing audio output and a video display device for providing textual, audiovisual and/or graphical output. Computing system environment 100 may also include optical scanners (not shown). Exemplary usages include scanning and converting paper documents, e.g., correspondence, receipts, and the like, to digital files.

Computing device 101 may operate in a networked environment supporting connections to one or more remote computing devices, such as computing devices 141, 151, and 161. Computing devices 141, 151, and 161 may be personal computing devices or servers that include any or all of the elements described above relative to computing device 101. Computing device 161 may be a mobile device (e.g., smart phone) communicating over wireless carrier channel 171.

The network connections depicted in FIG. 1 may include local area network (LAN) 125 and wide area network (WAN) 129, as well as other networks. When used in a LAN networking environment, computing device 101 may be connected to LAN 125 through a network interface or adapter in communications module 109. When used in a WAN networking environment, computing device 101 may include a modem in communications module 109 or other means for establishing communications over WAN 129, such as Internet 131 or other type of computer network. The network connections shown are illustrative and other means of establishing a communications link between the computing devices may be used. Various well-known protocols such as transmission control protocol/Internet protocol (TCP/IP), Ethernet, file transfer protocol (FTP), hypertext transfer protocol (HTTP) and the like may be used, and the system can be operated in a client-server configuration to permit a user to retrieve web pages from a web-based server. Any of various conventional web browsers can be used to display and manipulate data on web pages.

The disclosure is operational with numerous other general purpose or special purpose computing system environments or configurations. Examples of well-known computing systems, environments, and/or configurations that may be suitable for use with the disclosed embodiments include, but are not limited to, personal computers (PCs), server computers, hand-held or laptop devices, smart phones, multiprocessor systems, microprocessor-based systems, set top boxes, programmable consumer electronics, network PCs, minicomputers, mainframe computers, distributed computing environments that include any of the above systems or devices, and the like.

Figure 2:
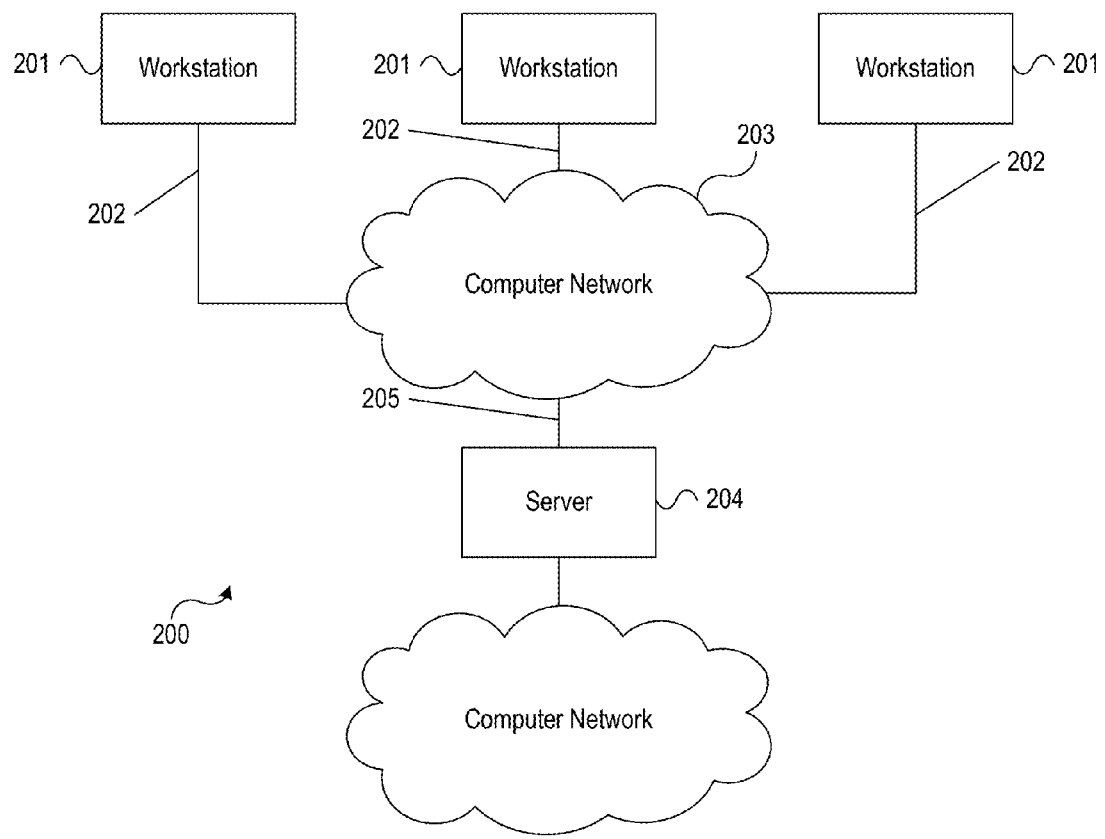
FIG. 2 depicts an illustrative block diagram of workstations and servers that may be used to implement the processes and functions of certain aspects of the present disclosure in accordance with one or more example embodiments.

FIG. 2 depicts an illustrative block diagram of workstations and servers that may be used to implement the processes and functions of certain aspects of the present disclosure in accordance with one or more example embodiments. Referring to FIG. 2, illustrative system 200 may be used for implementing example embodiments according to the present disclosure. As illustrated, system 200 may include one or more workstation computers 201. Workstation 201 may be, for example, a desktop computer, a smartphone, a wireless device, a tablet computer, a laptop computer, and the like. Workstations 201 may be local or remote, and may be connected by one of communications links 202 to computer network 203 that is linked via communications link 205 to server 204. In system 200, server 204 may be any suitable server, processor, computer, or data processing device, or combination of the same. Server 204 may be used to process the instructions received from, and the transactions entered into by, one or more participants.

Computer network 203 may be any suitable computer network including the Internet, an intranet, a wide-area network (WAN), a local-area network (LAN), a wireless network, a digital subscriber line (DSL) network, a frame relay network, an asynchronous transfer mode (ATM) network, a virtual private network (VPN), or any combination of any of the same. Communications links 202 and 205 may be any communications links suitable for communicating between workstations 201 and server 204, such as network links, dial-up links, wireless links, hard-wired links, as well as network types developed in the future, and the like.

Figure 3:
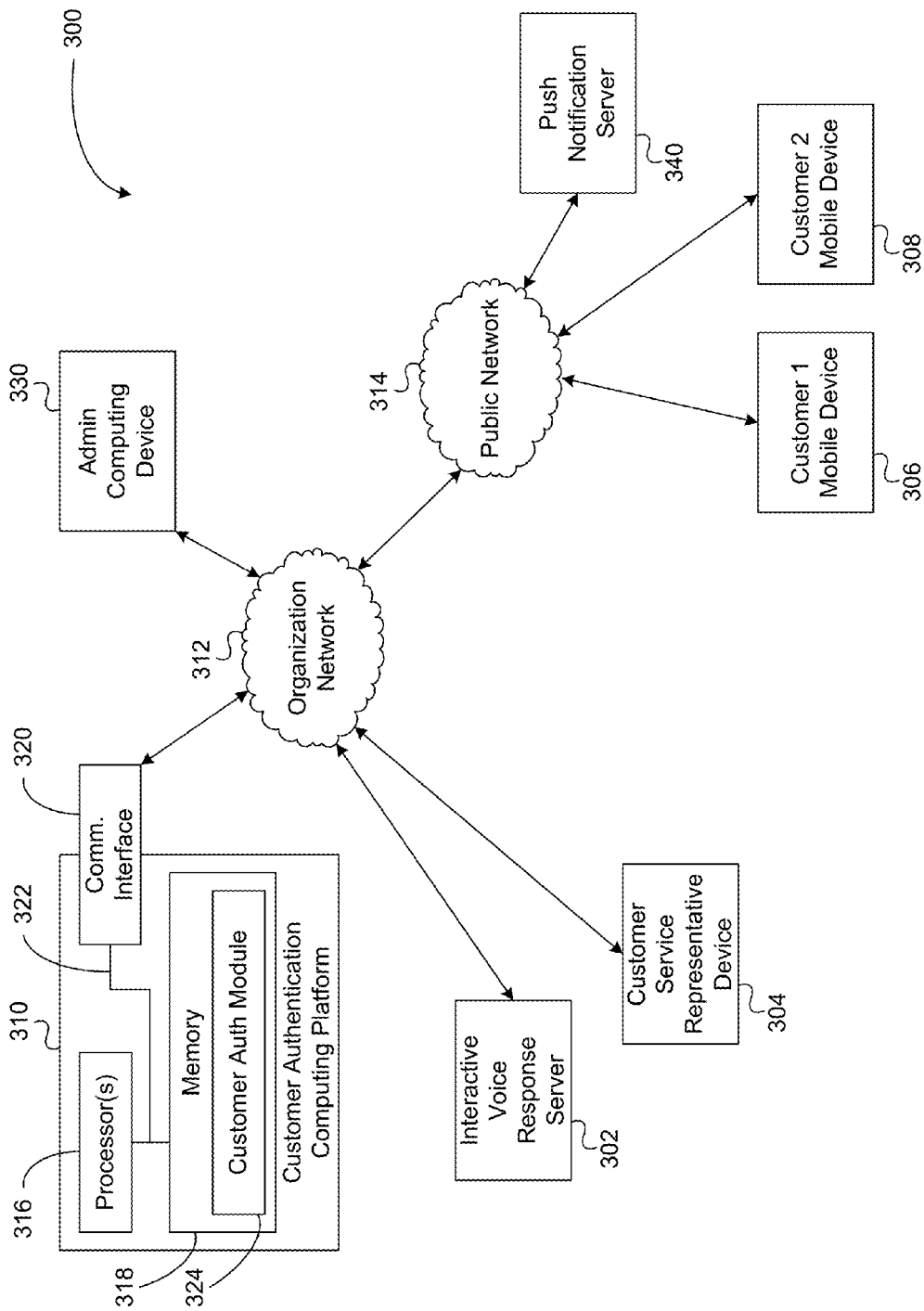
FIG. 3 depicts an illustrative computing environment for authenticating customers using biometrics in accordance with one or more example embodiments.

FIG. 3 depicts an illustrative computing environment for authenticating customers using biometrics in accordance with one or more example embodiments. Referring to FIG. 3, computing environment 300 may include one or more computing devices. For example, computing environment 300 may include an interactive voice response (IVR) server 302 (which may, e.g., be configured to place and/or receive telephone calls; process and respond to numerical and/or voice input received via one or more telephone connections; access, create, and/or modify data stored by one or more other computing devices and/or otherwise interact with one or more other computing devices; and/or provide various other telephony services). Computing environment 300 also may include a customer service representative computing device 304 (which may, e.g., be used by a customer service representative or agent of an organization, such as a financial institution that may utilize various aspects of the disclosure to authenticate customers using biometrics).

Computing environment 300 also may include a customer mobile device 306 (which may, e.g., be a mobile computing device that is used by a first customer of an organization, such as a customer of a financial institution). In addition, computing environment 300 may include a customer mobile device 308 (which may, e.g., be a mobile computing device that is used by a second customer of the organization different from the first customer of the organization, such as a different customer of the financial institution than the customer who may use customer mobile device 306).

Computing environment 300 also may include an administrative computing device 330 (which may, e.g., be used by and/or operated by an administrative user or other individual who may be associated with the organization and who may administer and/or otherwise control various computing devices and/or computer systems that are operated by and/or otherwise associated with the organization. In addition, computing environment 300 may include a push notification server 340 (which may, e.g., provide a push notification service that may be used to send one or more push notifications to various mobile computing devices, such as customer mobile device 306 and customer mobile device 308).

Interactive voice response server 302, customer service representative computing device 304, customer mobile device 306, customer mobile device 308, administrative computing device 330, and push notification server 340 may be any type of computing device capable of receiving a user interface, receiving input via the user interface, and communicating the received input to one or more other computing devices. For example, interactive voice response server 302, customer service representative computing device 304, customer mobile device 306, customer mobile device 308, administrative computing device 330, and push notification server 340 may be a server computer, a desktop computer, laptop computer, tablet computer, smart phone, or the like. As noted above, and as illustrated in greater detail below, any and/or all of interactive voice response server 302, customer service representative computing device 304, customer mobile device 306, customer mobile device 308, administrative computing device 330, and push notification server 340 may, in some instances, be special-purpose computing devices configured to perform specific functions.

Computing environment 300 also may include one or more computing platforms. For example, computing environment 300 may include customer authentication computing platform 310. Customer authentication computing platform 310 may include one or more computing devices configured to perform one or more of the functions described herein. For example, customer authentication computing platform 310 may include one or more computers (e.g., laptop computers, desktop computers, servers, server blades, or the like).

Computing environment 300 also may include one or more networks, which may interconnect one or more of interactive voice response server 302, customer service representative computing device 304, customer mobile device 306, customer mobile device 308, administrative computing device 330, push notification server 340, and customer authentication computing platform 310. For example, computing environment 300 may include organization network 312 and public network 314. Organization network 312 and/or public network 314 may include one or more sub-networks (e.g., LANs, WANs, or the like). Organization network 312 may be associated with a particular organization (e.g., a corporation, financial institution, educational institution, governmental institution, or the like) and may interconnect one or more computing devices associated with the organization. For example, interactive voice response server 302, customer service representative computing device 304, administrative computing device 330, and customer authentication computing platform 310 may be associated with an organization (e.g., a financial institution), and organization network 312 may be associated with and/or operated by the organization, and may include one or more networks (e.g., LANs, WANs, VPNs, or the like) that interconnect interactive voice response server 302, customer service representative computing device 304, administrative computing device 330, and customer authentication computing platform 310 and one or more other computing devices and/or computer systems that are used by, operated by, and/or otherwise associated with the organization. Public network 314 may connect organization network 312 and/or one or more computing devices connected thereto (e.g., interactive voice response server 302, customer service representative computing device 304, administrative computing device 330, and customer authentication computing platform 310) with one or more networks and/or computing devices that are not associated with the organization. For example, customer mobile device 306, customer mobile device 308, and push notification server 340 might not be associated with an organization that operates organization network 312, and public network 314 may include one or more networks (e.g., the Internet) that connect customer mobile device 306, customer mobile device 308, and push notification server 340 to organization network 312 and/or one or more computing devices connected thereto (e.g., interactive voice response server 302, customer service representative computing device 304, administrative computing device 330, and customer authentication computing platform 310).

Customer authentication computing platform 310 may include one or more processor(s) 316, memory 318, communication interface 320, and data bus 322. Data bus 322 may interconnect processor(s) 316, memory 318, and/or communication interface 320. Communication interface 320 may be a network interface configured to support communication between customer authentication computing platform 310 and organization network 312, or one or more sub-networks thereof. Memory 318 may include one or more program modules comprising instructions that when executed by the processor(s) 316 cause customer authentication computing platform 310 to perform one or more functions described herein. For example, memory 318 may include customer authentication module 324, which may comprise instructions that when executed by processor(s) 316 cause customer authentication computing platform 310 to perform one or more functions described herein.

Figure 4A:
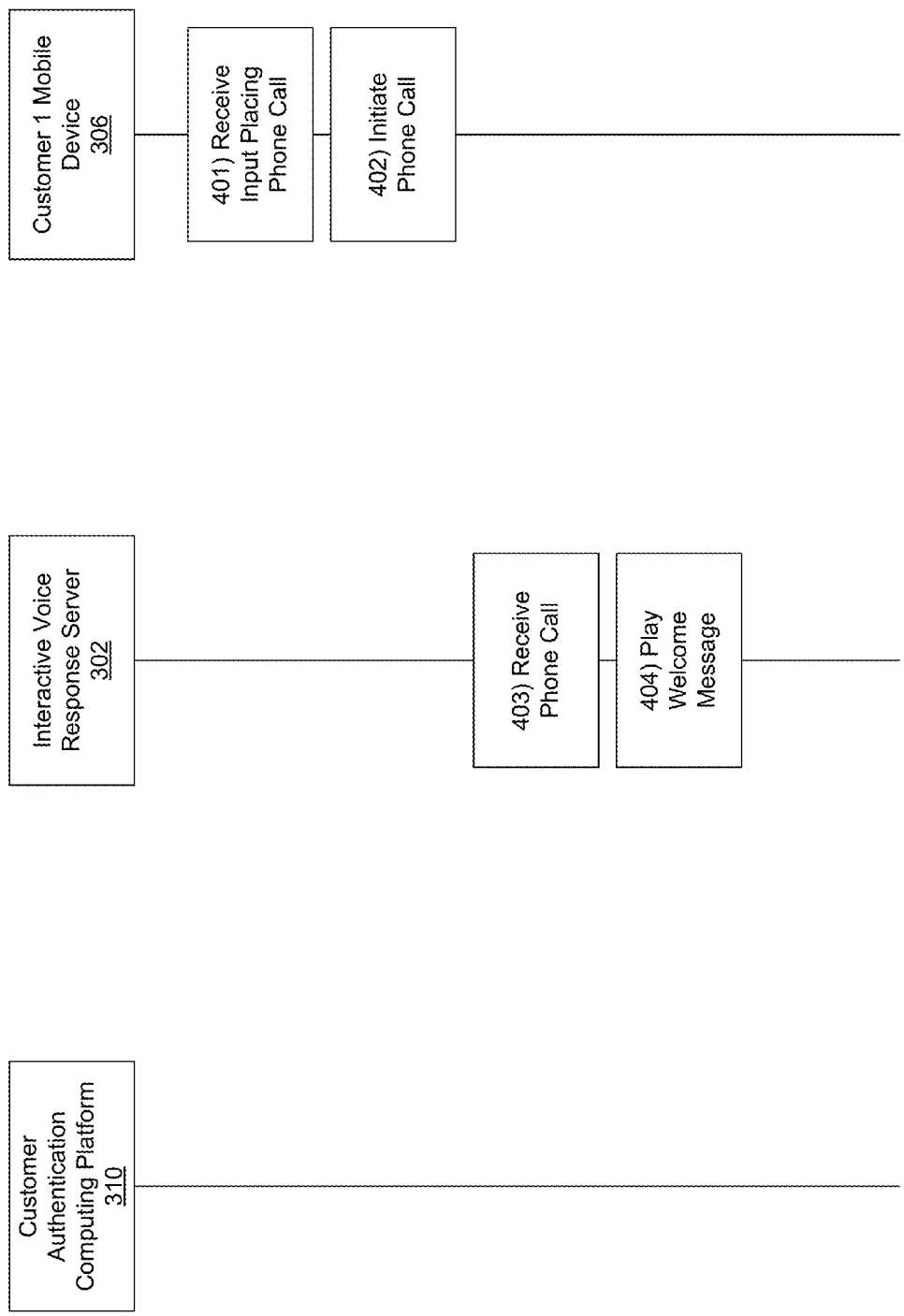

FIGS. 4A-4G depict an illustrative event sequence for authenticating customers using biometrics in accordance with one or more example embodiments. Referring to FIG. 4A, at step 401, customer mobile device 306 may receive input placing a phone call. For example, at step 401, customer mobile device 306 may receive input from the user of customer mobile device 306 placing a telephone call to a customer assistance telephone line that is operated by, provided by, and/or otherwise associated with a financial institution (which may, e.g., provide the customer assistance telephone line to allow its customers to receive automated assistance from an interactive voice response server and/or manual assistance from a customer service representative). As illustrated in greater detail below, by calling into such a customer assistance telephone line, the user of customer mobile device 306 (who may, e.g., be a customer of the financial institution) may be able to access account information and/or other customer data that is specific to the user of customer mobile device 306. For example, via the customer assistance telephone line, the user of customer mobile device 306 may be able to hear account balances, transfer funds between accounts, pay bills, hear information about other account details, receive assistance from a customer service representative, and/or perform other functions that involve accessing and/or interacting with the user's account information and/or customer data.

At step 402, customer mobile device 306 may initiate a telephone call. For example, at step 402, customer mobile device 306 may initiate a telephone call to the customer assistance line (which may, e.g., be provided by the financial institution, as discussed above) based on the input received from the user of customer mobile device 306 at step 401. As illustrated in greater detail below, the customer assistance line may, for example, be provided by one or more interactive voice response servers operated, controlled, and/or maintained by an organization (e.g., the financial institution), and a specific interactive voice response server that is operated, controlled, and/or maintained by the organization (e.g., the financial institution) may receive the telephone call from customer mobile device 306.

At step 403, interactive voice response server 302 may receive the telephone call from customer mobile device 306. For example, interactive voice response server 302 may provide a customer assistance line for an organization (e.g., the financial institution) that may be dialed by the user of customer mobile device 306 at step 401, and at step 403, interactive voice response server 302 may receive the telephone call initiated by customer mobile device 306 at step 402 to the customer assistance line on behalf of the organization (e.g., the financial institution). At step 404, interactive voice response server 302 may play a welcome message. For example, at step 404, interactive voice response server 302 may play an audio message to the user of customer mobile device 306, over the telephone connection established between interactive voice response server 302 and customer mobile device 306, that welcomes the user of customer mobile device 306 to the customer assistance line and/or provides instructions and/or other information about how the user of customer mobile device 306 may be authenticated by interactive voice response server 302 and/or the organization operating interactive voice response server 302 so as to access information via the customer assistance line.

Figure 4B:
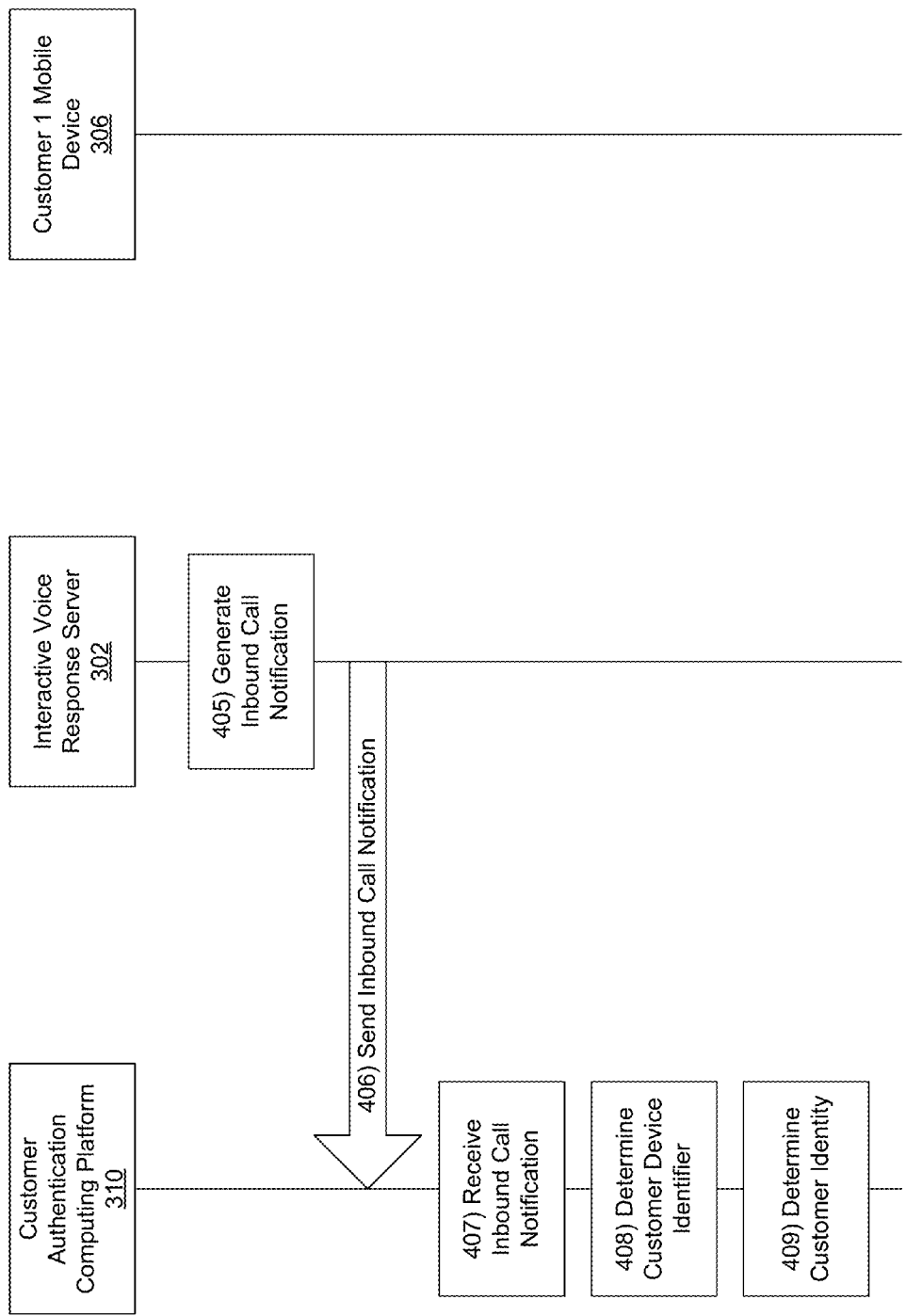

Referring to FIG. 4B, at step 405, interactive voice response server 302 may generate an inbound call notification. For example, at step 405, interactive voice response server 302 may generate an inbound call notification, which may be a data message that includes the inbound phone number of the call received from customer mobile device 306 (which may, e.g., be the telephone number of customer mobile device 306) and/or other information associated with the call received from customer mobile device 306, such as information identifying the mobile network operator and/or wireless service provider of customer mobile device 306. As illustrated in greater detail below, interactive voice response server 302 and/or customer authentication computing platform 310 may use such information (e.g., the inbound phone number of the call received from 306 and/or information identifying the mobile network operator and/or wireless service provider of customer mobile device 306) to determine a unique device identifier that has been defined for customer mobile device 306 (e.g., by the organization operating interactive voice response server 302 and/or customer authentication computing platform 310).

At step 406, interactive voice response server 302 may send the inbound call notification to customer authentication computing platform 310. At step 407, customer authentication computing platform 310 may receive the inbound call notification. For example, at step 407, customer authentication computing platform 310 may receive, via a communication interface (e.g., communication interface 320), and from an interactive voice response server (e.g., interactive voice response server 302), an inbound call notification associated with a telephone call received by the interactive voice response server (e.g., interactive voice response server 302) from a mobile device (e.g., customer mobile device 306). As discussed above, the inbound call notification may include information identifying the inbound phone number of the telephone call received by interactive voice response server 302 from customer mobile device 306 (which may, e.g., be the telephone number of customer mobile device 306) and/or other information associated with the call received from customer mobile device 306, such as information identifying the mobile network operator and/or wireless service provider of customer mobile device 306.

At step 408, customer authentication computing platform 310 may determine a customer device identifier. For example, at step 408, customer authentication computing platform 310 may determine a device identifier of the mobile device (e.g., customer mobile device 306). In determining the device identifier of the mobile device, customer authentication computing platform 310 may, for instance, access information stored in one or more data tables (which may, e.g., be maintained by customer authentication computing platform 310 and/or by one or more other computing devices connected to customer authentication computing platform 310) that relates inbound telephone numbers, mobile network operators, and/or wireless service providers, to unique hardware device identifiers. For example, based on accessing such information, customer authentication computing platform 310 may determine the particular unique device identifier for customer mobile device 306 based on information identifying the inbound telephone number for the call received by interactive voice response server 302 from customer mobile device 306 and based on information identifying the mobile network operator and/or wireless service provider for customer mobile device 306 (which may, e.g., be determined by and/or provided to customer authentication computing platform 310 by interactive voice response server 302 and/or one or more other computing devices connected to customer authentication computing platform 310).

At step 409, customer authentication computing platform 310 may determine a customer identity. For example, at step 409, customer authentication computing platform 310 may determine a customer identifier corresponding to a user of the mobile device (e.g., customer mobile device 306). The customer identifier may, for instance, uniquely identify a particular customer of an organization (e.g., the financial institution) as being an authorized user of customer mobile device 306. For example, the customer identifier may identify the user of the mobile device (e.g., customer mobile device 306) as a customer of an organization operating the system (e.g., customer authentication computing platform 310). In some instances, customer authentication computing platform 310 may determine the customer identifier corresponding to the user of the mobile device (e.g., customer mobile device 306) based on the customer device identifier determined at step 408. For example, after determining the customer device identifier, customer authentication computing platform 310 may determine the customer identifier (which may, e.g., also be referred to as the customer identity) by accessing information stored in one or more data tables (which may, e.g., be maintained by customer authentication computing platform 310 and/or by one or more other computing devices connected to customer authentication computing platform 310) that relates specific customer device identifiers to specific customer identifiers. In some instances, the customer identifier may, for example, be a username that is associated with the user of the mobile device (e.g., customer mobile device 306) when accessing other electronic resources provided by the organization (e.g., the financial institution), such as a customer portal (e.g., an online banking website) or customer application (e.g., a mobile banking application).

Figure 4C:
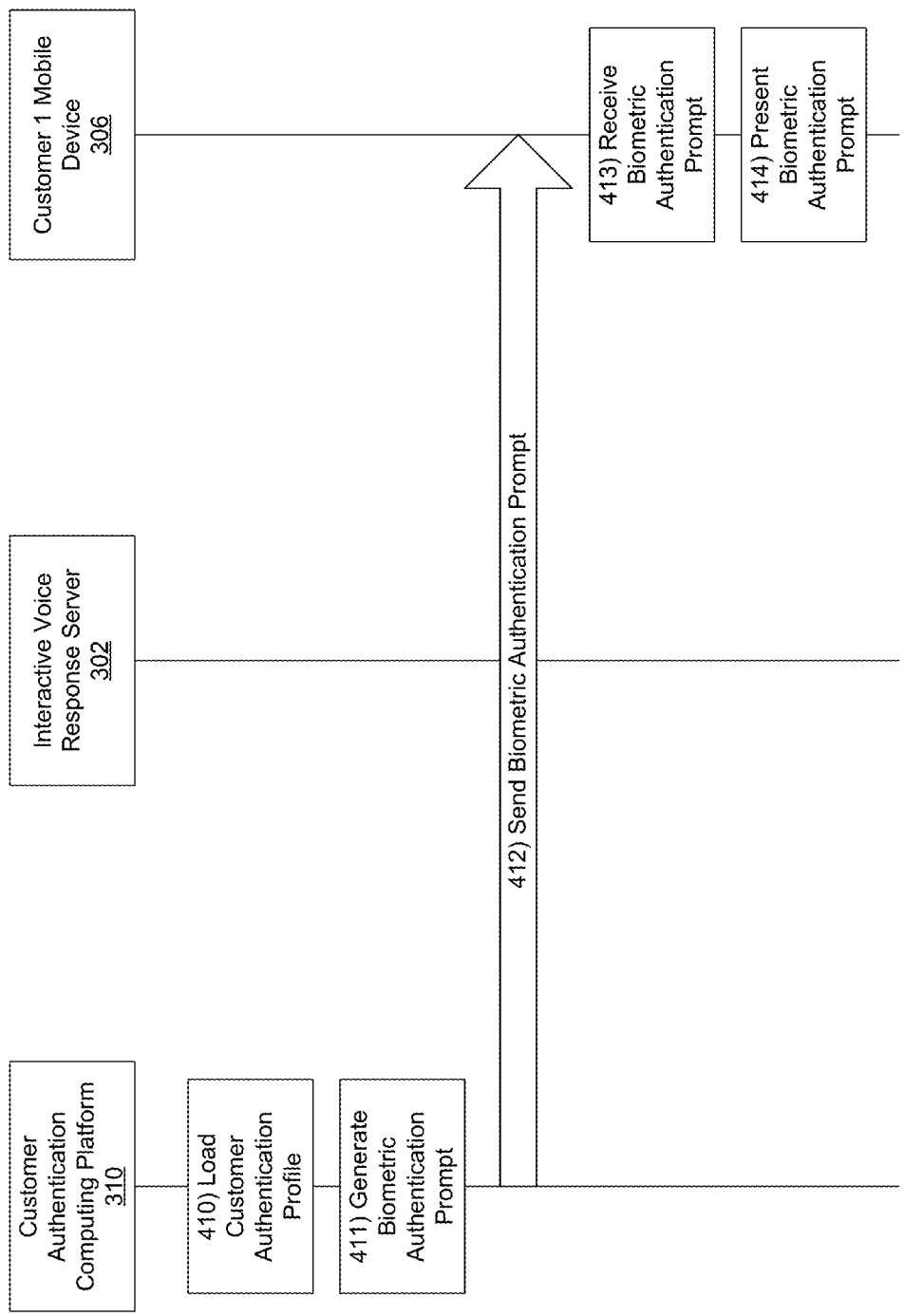

Referring to FIG. 4C, at step 410, customer authentication computing platform 310 may load a customer authentication profile. For example, at step 410, customer authentication computing platform 310 may load a customer authentication profile based on the customer identifier determined at step 409. The customer authentication profile that is loaded by customer authentication computing platform 310 may, for example, be specific to the user of customer mobile device 306 and thus may be loaded based on the customer identifier determined by customer authentication computing platform 310 at step 409. Additionally or alternatively, the customer authentication profile may, for instance, include information defining one or more authentication preferences for the user of customer mobile device 306, such as information identifying one or more authentication methods that the user of customer mobile device 306 has enrolled in and/or otherwise selected for use, including one or more biometric authentication methods.

In some embodiments, the customer authentication profile may include information indicating that the user of the mobile device has registered the mobile device to receive biometric authentication prompts. For example, the customer authentication profile (which may, e.g., be loaded by customer authentication computing platform 310 at step 410) may include information indicating that the user of customer mobile device 306 has registered customer mobile device 306 (e.g., with customer authentication computing platform 310, with the organization operating customer authentication computing platform 310) to receive biometric authentication prompts (e.g., from customer authentication computing platform 310). For instance, the user of customer mobile device 306 may have pre-registered customer mobile device 306 to receive biometric authentication prompts from customer authentication computing platform 310 and/or the organization operating customer authentication computing platform 310 during an enrollment and/or registration process (which may, e.g., be performed by customer authentication computing platform 310 and/or customer mobile device 306 prior to step 401 of the example event sequence discussed here). During such an enrollment and/or registration process, the user of customer mobile device 306 may, for instance, opt-in to receiving biometric authentication prompts from customer authentication computing platform 310 and/or the organization operating customer authentication computing platform 310, may store one or more biometric credentials (e.g., fingerprints, voiceprints, and/or the like) on customer mobile device 306, and/or may authorize such biometric credentials to be used by customer authentication computing platform 310 and/or the organization operating customer authentication computing platform 310 as valid authenticators for the user of customer mobile device 306.

In some embodiments, the customer authentication profile may include information indicating that the mobile device stores one or more predefined biometric credentials. For example, the customer authentication profile (which may, e.g., be loaded by customer authentication computing platform 310 at step 410) may include information indicating that the mobile device (e.g., customer mobile device 306) stores one or more predefined biometric credentials, such as one or more fingerprint biometric credentials, voiceprint biometric credentials, and/or other biometric credentials that may, for instance, be stored by the mobile device (e.g., customer mobile device 306) during an enrollment and/or registration process, as discussed above.

At step 411, customer authentication computing platform 310 may generate a biometric authentication prompt. For example, at step 411, customer authentication computing platform 310 may generate a biometric authentication prompt for authenticating the user of the mobile device (e.g., customer mobile device 306). In some instances, in generating the biometric authentication prompt, customer authentication computing platform 310 may, for example, generate a data message that includes information configured to cause the mobile device (e.g., customer mobile device 306) to authenticate the user of the mobile device using biometrics. In addition, such a message may be configured to be sent directly to the mobile device (e.g., customer mobile device 306) from customer authentication computing platform 310, or alternatively, to the mobile device (e.g., customer mobile device 306) via a push notification service, such as a push notification service provided by push notification server 340. For example, push notification server 340 may be configured to receive requests to send push notifications from one or more other computer systems and devices, such as customer authentication computing platform 310, and may be further configured to generate and/or send push notifications to one or more mobile devices (e.g., customer mobile device 306, customer mobile device 308) based on such requests. In some instances, push notification server 340 may be configured to communicate with mobile devices running one or more specific operating systems, while in other instances, push notification server 340 may be configured to communicate with mobile devices running various different operating systems. Additionally or alternatively, push notification server 340 may, in some instances, be operated and/or maintained by an organization operating customer authentication computing platform 310, such as a financial institution, while in other instances, push notification server 340 may be operated and/or maintained by a different organization, such as an organization that develops and/or distributes operating systems to various mobile devices (e.g., customer mobile device 306, customer mobile device 308).

At step 412, customer authentication computing platform 310 may send the biometric authentication prompt to customer mobile device 306. For example, at step 412, customer authentication computing platform 310 may cause the biometric authentication prompt to be sent to the mobile device (e.g., customer mobile device 306). As discussed above, in some instances, customer authentication computing platform 310 may send the biometric authentication prompt directly to customer mobile device 306 (e.g., via a data connection established between customer authentication computing platform 310 and customer mobile device 306), while in other instances, customer authentication computing platform 310 may send the biometric authentication prompt to customer mobile device 306 via a push notification service, such as a push notification service provided by push notification server 340.

In some embodiments, causing the biometric authentication prompt to be sent to the mobile device may include causing a push notification service to send a push notification to the mobile device. For example, in causing the biometric authentication prompt to be sent to the mobile device at step 412, customer authentication computing platform 310 may cause a push notification service (which may, e.g., be provided by push notification server 340) to send a push notification to the mobile device (e.g., customer mobile device 306), as discussed above.

In some embodiments, the biometric authentication prompt may be configured to prompt the user of the mobile device to provide biometric input for verification by the mobile device. For example, the biometric authentication prompt (which may, e.g., be generated at step 411 and/or sent at step 412) may be configured to prompt the user of the mobile device (e.g., customer mobile device 306) to provide biometric input for verification by the mobile device (e.g., customer mobile device 306). In verifying the biometric input, the mobile device may, for instance, compare the biometric input with one or more predefined and/or stored biometric credentials, as discussed in greater detail below. In some instances, the biometric input (e.g., that the biometric authentication prompt may prompt the user of the mobile device to provide) may be fingerprint biometric input, such as a thumbprint or other fingerprint that may be read by a fingerprint scanner included in and/or coupled to the mobile device (e.g., customer mobile device 306). Additionally or alternatively, the biometric input may be and/or include other types of biometric input, such as voiceprint biometric input, facial image biometric input, and/or the like.

Figure 5:
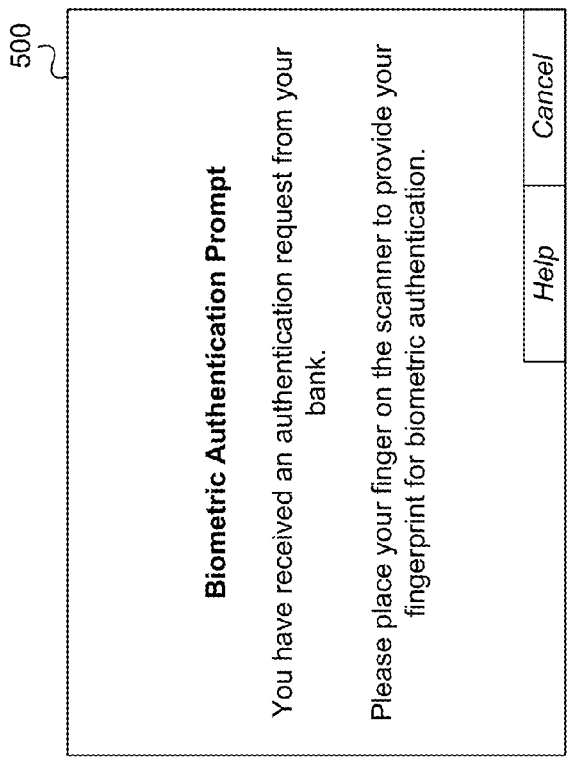

At step 413, customer mobile device 306 may receive the biometric authentication prompt. For example, at step 413, customer mobile device 306 may receive the biometric authentication prompt from customer authentication computing platform 310 and/or via a push notification service, such as a push notification service provided by push notification server 340. At step 414, customer mobile device 306 may present the biometric authentication prompt. For example, in presenting the biometric authentication prompt at step 414, customer mobile device 306 may display, cause to be displayed, and/or otherwise present a graphical user interface similar to graphical user interface 500, which is illustrated in FIG. 5. As seen in FIG. 5, graphical user interface 500 may include text and/or other information prompting the user of customer mobile device 306 to provide biometric input, such as one or more fingerprints, for validation by customer mobile device 306.

Referring to FIG. 4D, at step 415, customer mobile device 306 may receive biometric input. For example, at step 415, customer mobile device 306 may receive biometric input from the user of customer mobile device 306 that includes one or more fingerprints of the user of customer mobile device 306, one or more voiceprints of the user of customer mobile device 306, one or more images of the user of customer mobile device 306 (e.g., for facial recognition and/or other image recognition), and/or other biometric input associated with the user of customer mobile device 306. At step 416, customer mobile device 306 may validate the biometric input. For example, in validating the biometric input at step 416, customer mobile device 306 may compare the biometric input with stored information defining valid biometric credentials of the user of customer mobile device 306 to determine whether the biometric input is a valid match to the stored information defining the valid biometric credentials of the user of customer mobile device 306.

Figure 6:
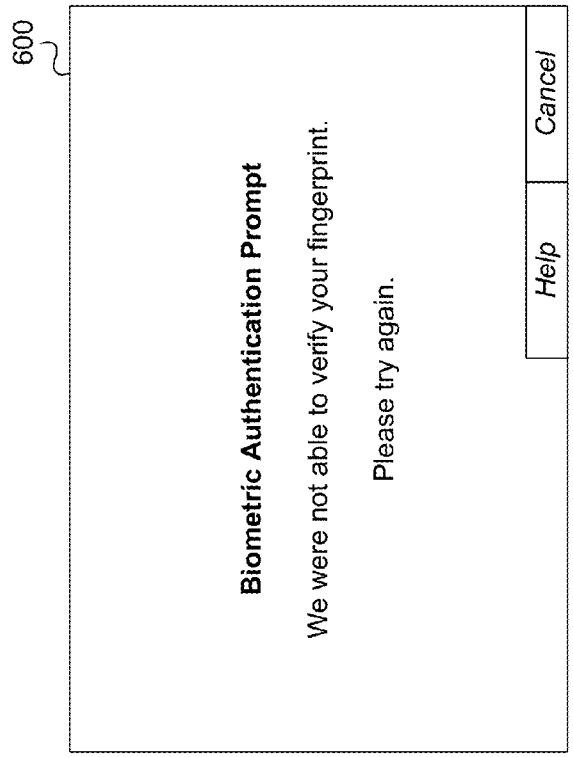
FIGS. 5-7 depict example graphical user interfaces for authenticating customers using biometrics in accordance with one or more example embodiments.

In validating the biometric input, if customer mobile device 306 determines that the biometric input received from the user of customer mobile device 306 is invalid, customer mobile device 306 may generate and/or present an error message and/or may request the user of customer mobile device 306 to attempt to provide additional biometric input. For example, if customer mobile device 306 determines that the biometric input received from the user of customer mobile device 306 is invalid, customer mobile device 306 may display, cause to be displayed, and/or otherwise present a graphical user interface similar to graphical user interface 600, which is illustrated in FIG. 6. As seen in FIG. 6, graphical user interface 600 may include text and/or other information indicating that the biometric input received from the user of customer mobile device 306 could not be verified and/or prompting the user of customer mobile device 306 to attempt to provide such biometric input again for verification by customer mobile device 306. Customer mobile device 306 may, for example, be configured to allow the user of customer mobile device 306 to make a predefined number of attempts (e.g., three attempts, five attempts, and/or the like) at providing valid biometric input, and if after the predefined number of attempts, valid biometric input is still not received and the user of customer mobile device 306 cannot be verified, customer mobile device 306 may send a message to customer authentication computing platform 310 indicating that the telephone call placed from customer mobile device 306 to interactive voice response server 302 should be transferred to agent so as to authenticate the user of customer mobile device 306 in a different way (e.g., by having the user of customer mobile device 306 provide a user identifier, passcode, security question answer(s), and/or the like).

Figure 7:
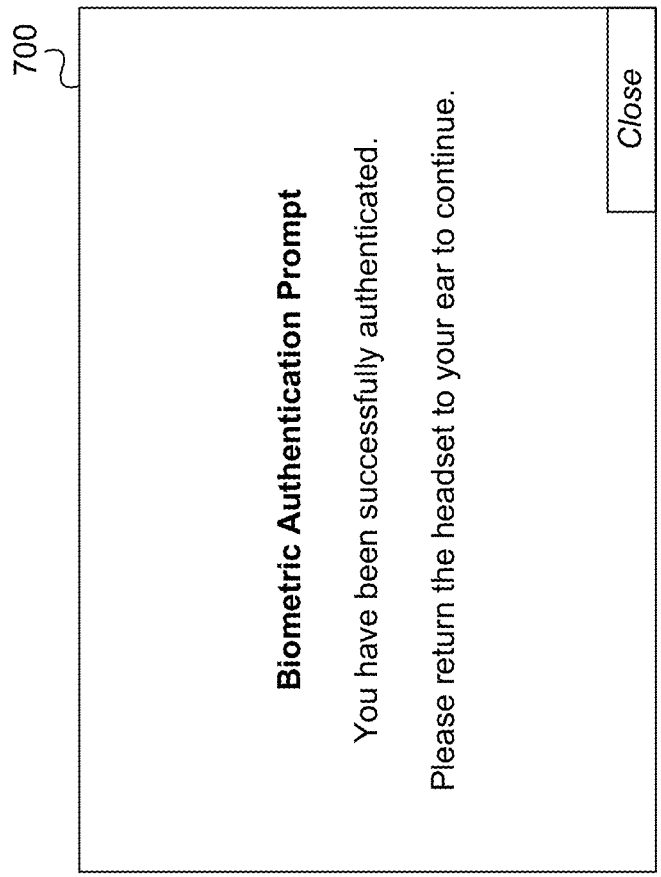

Alternatively, in validating the biometric input, if customer mobile device 306 determines that the biometric input received from the user of customer mobile device 306 is valid, customer mobile device 306 may generate and/or present a successful authentication message and the event sequence may continue to step 417, as discussed in greater detail below. In presenting such a successful authentication message, customer mobile device 306 may, for example, display, cause to be displayed, and/or otherwise present a graphical user interface similar to graphical user interface 700, which is illustrated in FIG. 7. As seen in FIG. 7, graphical user interface 700 may include text and/or other information indicating that the biometric input received from the user of customer mobile device 306 was successfully verified and/or instructing the user of customer mobile device 306 to return a headset of customer mobile device 306 to their ear to continue with the telephone call (e.g., to the customer assistance line provided by interactive voice response server 302).

Referring again to FIG. 4D, at step 417, customer mobile device 306 may generate a validation message. For example, after validating the biometric input received from the user of customer mobile device 306 (e.g., at step 416), customer mobile device 306 may generate a validation message that includes information indicating that valid biometric input was received from the user of customer mobile device 306 and/or that the user of customer mobile device 306 was successfully authenticated based on biometric input provided by the user of customer mobile device 306 to customer mobile device 306 for verification. At step 418, customer mobile device 306 may send the validation message to customer authentication computing platform 310.

At step 419, customer authentication computing platform 310 may receive the validation message from customer mobile device 306. For example, at step 419, customer authentication computing platform 310 may receive, via the communication interface (e.g., communication interface 320), and from the mobile device (e.g., customer mobile device 306), a validation message. As discussed above, the validation message may be generated by customer mobile device 306 and/or may include information indicating that valid biometric input was received from the user of customer mobile device 306 and/or that the user of customer mobile device 306 was successfully authenticated based on biometric input provided by the user of customer mobile device 306 to customer mobile device 306 for verification. In some embodiments, the validation message may indicate that the user of the mobile device has provided valid biometric input matching one or more predefined biometric credentials stored by the mobile device. For example, the validation message (which may, e.g., be received by customer authentication computing platform 310 at step 419) may include information indicating that the user of customer mobile device 306 has provided valid biometric input matching one or more predefined biometric credentials stored by customer mobile device 306. Such predefined biometric credentials may, for instance, include one or more fingerprint biometric credentials stored by customer mobile device 306 and/or one or more other biometric credentials stored by customer mobile device 306 (which may, e.g., be stored and/or defined during an enrollment and/or registration process, as discussed above).

Figure 4E:
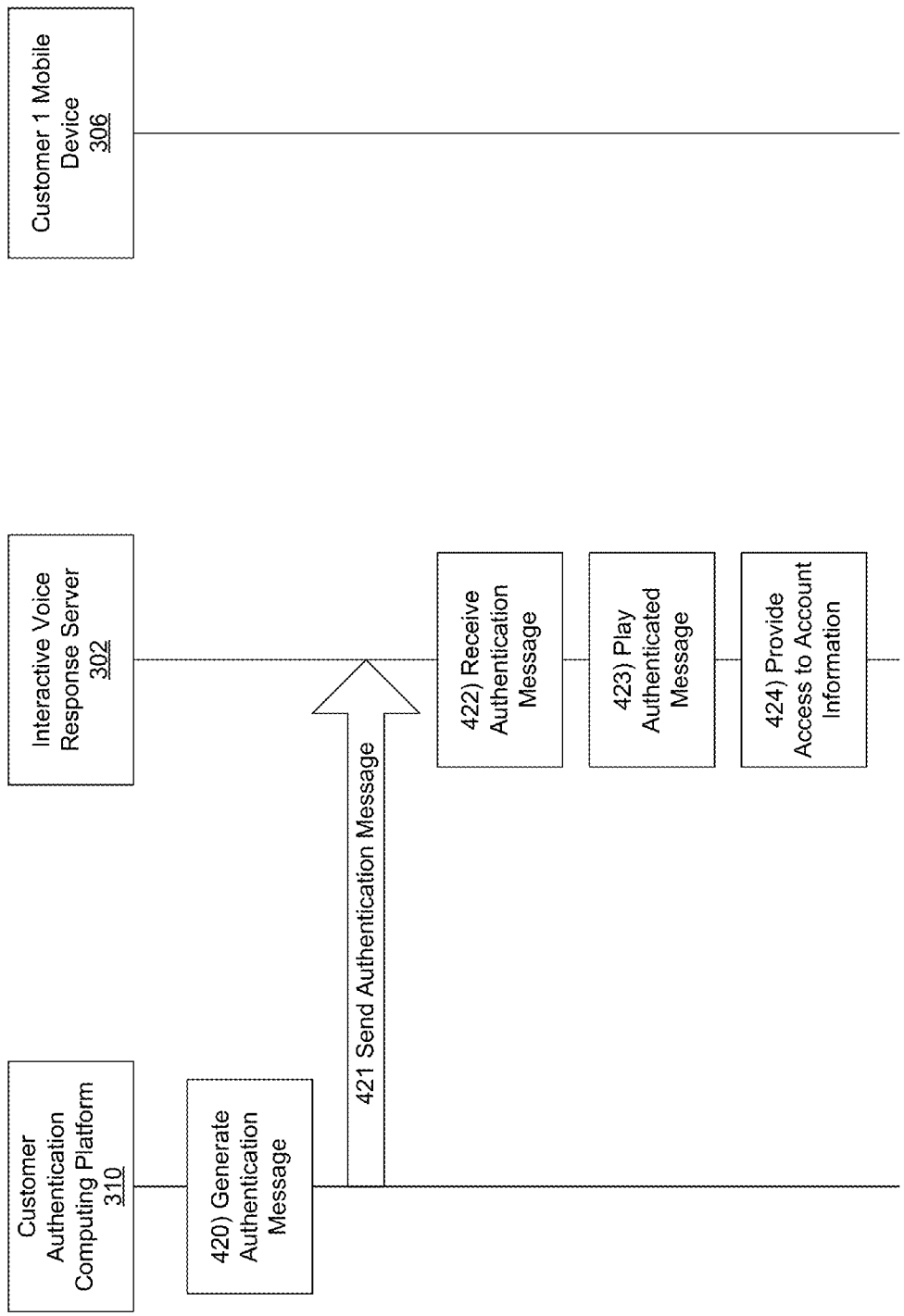

Referring to FIG. 4E, at step 420, customer authentication computing platform 310 may generate an authentication message. For example, in response to receiving the validation message (e.g., at step 419), customer authentication computing platform 310 may generate an authentication message at step 420. Such an authentication message may, for example, include information indicating that the user of the mobile device (e.g., customer mobile device 306) has been successfully authenticated using one or more biometric credentials and/or may be configured to cause the interactive voice response server (e.g., interactive voice response server 302) to treat the user of customer mobile device 306 as authenticated in the telephone call from the mobile device (e.g., customer mobile device 306) to the customer assistance line provided by the interactive voice response server (e.g., interactive voice response server 302), as illustrated in greater detail below. At step 421, customer authentication computing platform 310 may send the authentication message to interactive voice response server 302. For example, at step 421, customer authentication computing platform may send, via the communication interface (e.g., communication interface 320), and to the interactive voice response server (e.g., interactive voice response server 302), the authentication message generated at step 420.

In some embodiments, the authentication message may establish an authentication status of the user of the mobile device. For example, the authentication message (which may, e.g., be sent to interactive voice response server 302 by customer authentication computing platform 310 at step 421) may establish an authentication status of the user of the mobile device (e.g., customer mobile device 306). For instance, the authentication message may include information indicating that the user of customer mobile device 306 has been authenticated by customer authentication computing platform 310 and thus may be treated as authenticated by interactive voice response server 302 (e.g., for purposes of accessing account information and/or other customer-specific data). Additionally or alternatively, the authentication message may be configured to cause the interactive voice response server to provide the user of the mobile device with access to account information that is specific to the user of the mobile device. For example, the authentication message (which may, e.g., be sent to interactive voice response server 302 by customer authentication computing platform 310 at step 421) may be configured to cause the interactive voice response server (e.g., interactive voice response server 302) to provide the user of the mobile device (e.g., customer mobile device 306) with access to account information that is specific to the user of the mobile device (e.g., customer mobile device 306). For instance, the authentication message may include instructions, commands, and/or information that cause interactive voice response server 302 to provide customer mobile device 306 and/or the user of customer mobile device 306 with access to account information that is specific to the user of customer mobile device 306 on the telephone call, such as account balance information for the user's accounts, access to funds transfer functions, and/or other account information and/or functions.

At step 422, interactive voice response server 302 may receive the authentication message from customer authentication computing platform 310. At step 423, interactive voice response server 302 may play an authenticated message. For example, at step 423, interactive voice response server 302 may play an audio message to the user of customer mobile device 306, over the telephone connection established between interactive voice response server 302 and customer mobile device 306, that informs the user of customer mobile device 306 that he or she has been successfully authenticated and/or indicates to the user of customer mobile device 306 that he or she can access account information via the customer assistance line.

At step 424, interactive voice response server 302 may provide access to account information. For example, at step 424, interactive voice response server 302 may provide the user of customer mobile device 306 with access to account information over the telephone connection established between interactive voice response server 302 and customer mobile device 306 based on the authentication message received by interactive voice response server 302 at step 422. In providing access to account information, interactive voice response server 302 may, for example, play and/or otherwise provide a function menu that includes user-selectable options for different functions available via the telephone assistance line, and such a function menu may include a number of audio prompts (e.g., "press 1 to hear account balance information, press 2 to transfer funds between accounts, press 3 to access bill pay features, press 0 to speak with a representative"). By providing access to account information in this way (e.g., based on biometric authentication credentials validated by customer mobile device 306 and/or customer authentication computing platform 310, as discussed above), the user of customer mobile device 306 advantageously might not need to provide any additional authentication credentials, such as their account number(s) and/or passcode(s), over the phone. Rather, the biometric authentication processes discussed above provide a more streamlined, efficient, and easy-to-use authentication solution for customers of the organization (e.g., the financial institution). In addition, and as illustrated in greater detail below, once the user of customer mobile device 306 has been authenticated, the user of customer mobile device 306 may access and/or interact with account information via the telephone assistance line, and such interaction may, for example, include requesting and/or executing one or more transactions involving one or more accounts of the user of customer mobile device 306.

Referring to FIG. 4F, at step 425, interactive voice response server 302 may receive input requesting a transaction. For example, at step 425, interactive voice response server 302 may receive input from the user of customer mobile device 306 over the telephone connection between interactive voice response server 302 and customer mobile device 306, and such input may request a transaction (e.g., a funds transfer transaction, a bill pay transaction, and/or the like) involving one or more accounts of the customer using customer mobile device 306. At step 426, interactive voice response server 302 may generate a transaction request (e.g., based on the input received at step 425). Such a transaction request may, for instance, include information identifying the type of transaction requested (e.g., a funds transfer transaction, a bill pay transaction, and/or the like), the amount of the transaction, a source account, a target account, and/or other information associated with the transaction. At step 427, interactive voice response server 302 may send the transaction request to customer authentication computing platform 310.

At step 428, customer authentication computing platform 310 may receive the transaction request. For example, after sending the authentication message (e.g., at step 421), customer authentication computing platform 310 may receive, via the communication interface (e.g., communication interface 320), and from the interactive voice response server (e.g., interactive voice response server 302), a transaction request. The transaction request may, for instance, include information requesting a transaction to be performed on one or more accounts that are owned by and/or otherwise associated with the user of customer mobile device 306, as well as information identifying the type of transaction requested (e.g., a funds transfer transaction, a bill pay transaction, and/or the like), the amount of the transaction, a source account, a target account, and/or other information associated with the transaction. At step 429, customer authentication computing platform 310 may process the transaction request. In processing the transaction request, customer authentication computing platform 310 may, for instance, send instructions to and/or otherwise communicate with one or more other computer systems that may be operated by the organization (e.g., the financial institution) so as to complete the requested transaction. For example, customer authentication computing platform 310 may instruct one or more other computer systems to perform a requested funds transfer transaction by crediting a particular account and debiting another account. In some embodiments, processing the transaction request may include causing one or more systems operated by a financial institution to execute a funds transfer transaction. For instance, in processing the transaction request at step 429, customer authentication computing platform 310 may cause one or more systems operated by a financial institution (which may, e.g., be the financial institution operating customer authentication computing platform 310) to execute a funds transfer transaction (e.g., be crediting and/or debiting one or more accounts, as discussed above).

Figure 4G:
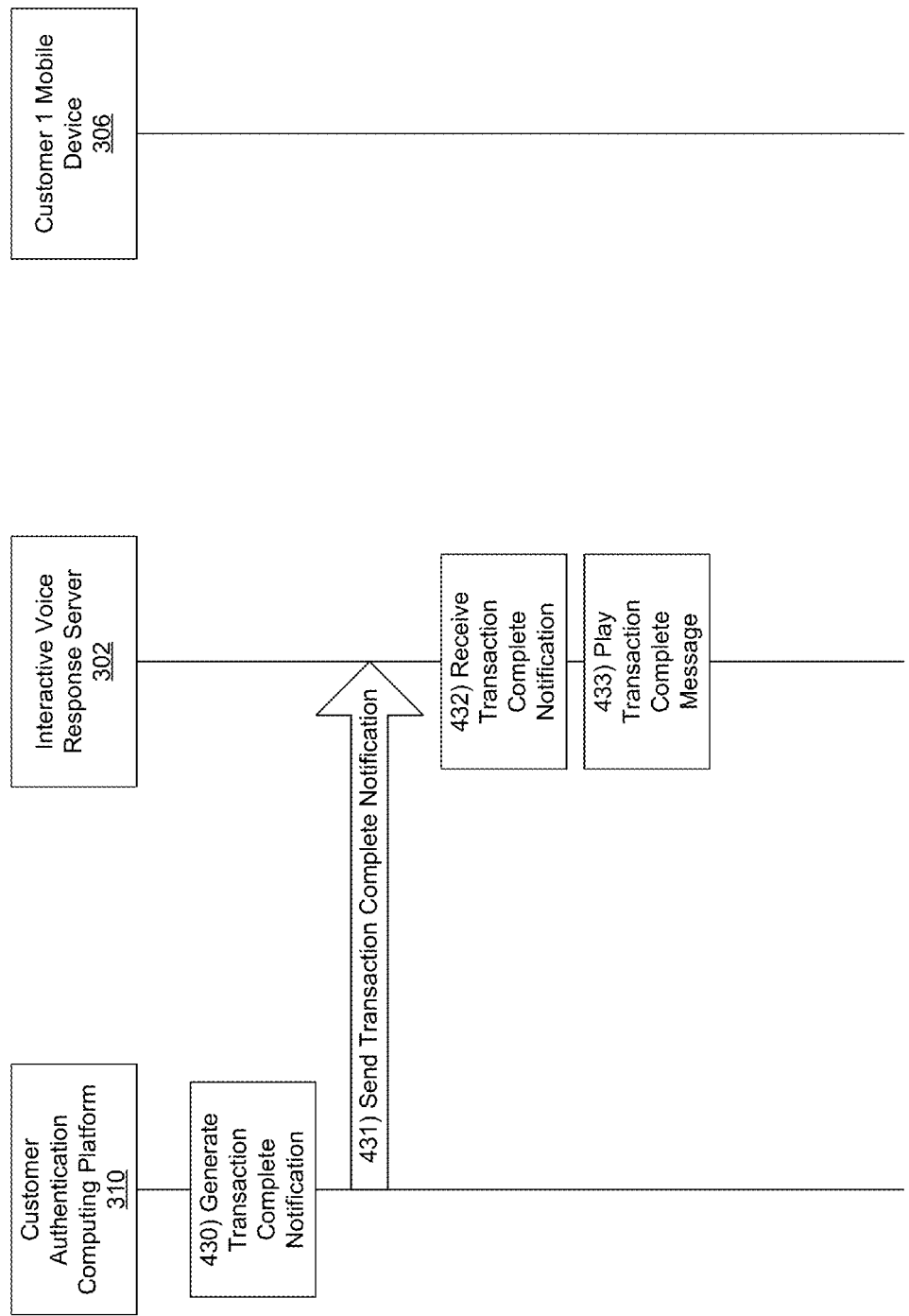

Referring to FIG. 4G, at step 430, customer authentication computing platform 310 may generate a transaction complete notification. Such a transaction complete notification may, for example, include information indicating that the requested transaction has been completed. At step 431, customer authentication computing platform 310 may send the transaction complete notification to interactive voice response server 302. At step 432, interactive voice response server 302 may receive the transaction complete notification. At step 433, interactive voice response server 302 may play a transaction complete message. For example, at step 433, interactive voice response server 302 may play an audio message to the user of customer mobile device 306, over the telephone connection established between interactive voice response server 302 and customer mobile device 306, that informs the user of customer mobile device 306 that the requested transaction has been initiated, executed, and/or completed.

In one or more arrangements, if at any point in the example event sequence discussed above the customer using customer mobile device 306 requests assistance from a customer service representative, interactive voice response server 302 may transfer the telephone call to a customer service representative (who may, e.g., be using customer service representative computing device 304). In addition, if the customer using customer mobile device 306 has been authenticated when the telephone call is transferred to a customer service representative, customer authentication computing platform 310 may provide information about the customer using customer mobile device 306, including information establishing the authentication status of the customer using customer mobile device 306 and/or other information indicating that the customer using customer mobile device 306 has been authenticated using biometric input, to customer service representative computing device 304. Additionally or alternatively, one or more steps of the example event sequence may be repeated, for instance, as telephone calls are received from other mobile devices. For example, a similar event sequence may be performed and/or repeated if interactive voice response server 302 receives a telephone call from customer mobile device 308 (which may, e.g., be used by and/or registered to a different customer than customer mobile device 306).

Figure 8:
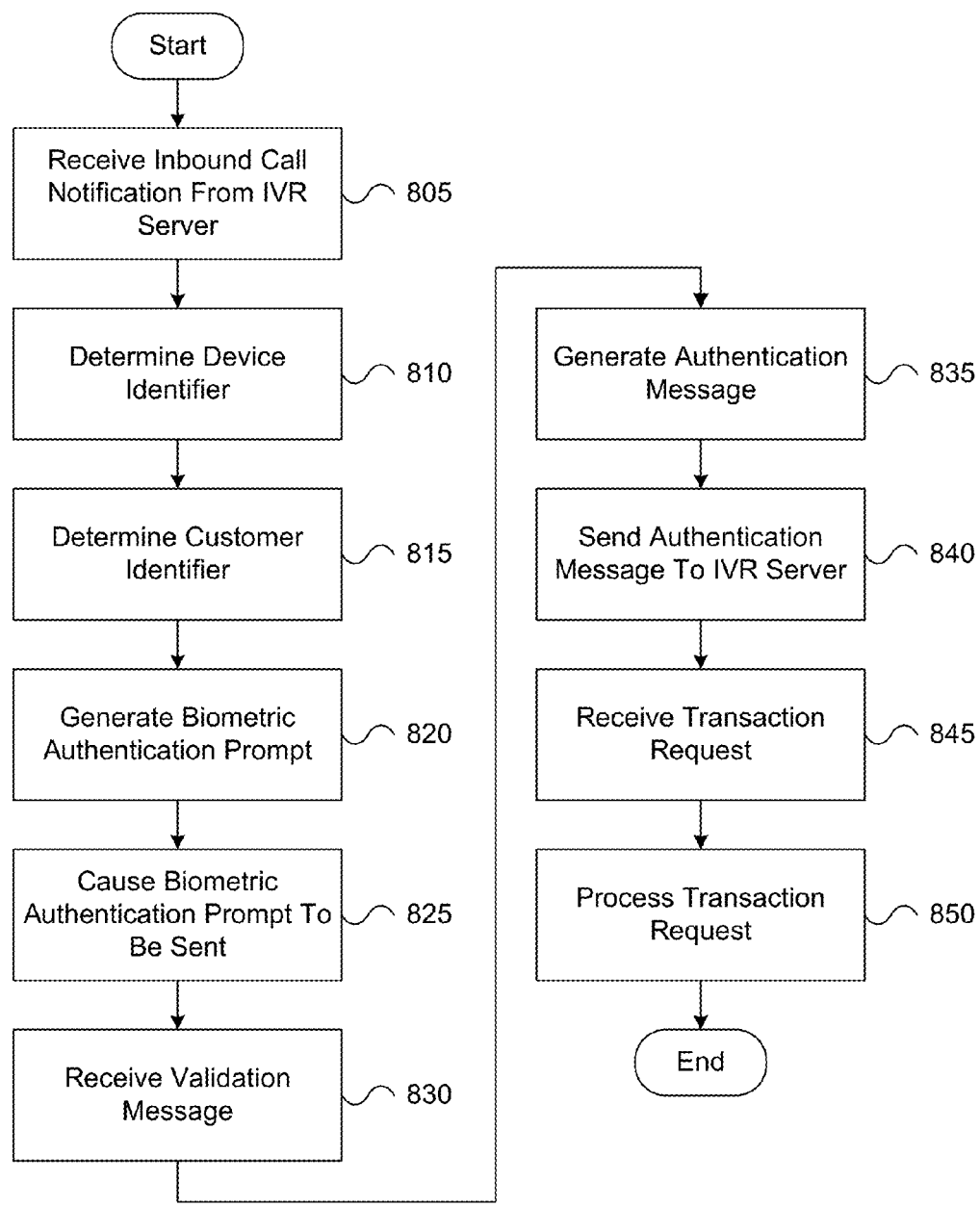
FIG. 8 depicts an illustrative method for authenticating customers using biometrics in accordance with one or more example embodiments.

FIG. 8 depicts an illustrative method for authenticating customers using biometrics in accordance with one or more example embodiments. Referring to FIG. 8, at step 805, a computing platform may receive, from an interactive voice response server, an inbound call notification associated with a telephone call received by the interactive voice response server from a mobile device. At step 810, the computing platform may determine a device identifier of the mobile device. At step 815, the computing platform may determine a customer identifier corresponding to a user of the mobile device. At step 820, the computing platform may load a customer authentication profile based on the customer identifier. At step 825, the computing platform may generate a biometric authentication prompt for authenticating the user of the mobile device. At step 825, the computing platform may cause the biometric authentication prompt to be sent to the mobile device. At step 830, the computing platform may receive, from the mobile device, a validation message. At step 835, in response to receiving the validation message, the computing platform may generate an authentication message. At step 840, the computing platform may send, to the interactive voice response server, the authentication message. At step 845, after sending the authentication message, the computing platform may receive, from the interactive voice response server, a transaction request. At step 850, the computing platform may process the transaction request.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may comprise one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A system, comprising:
   at least one processor;
   a communication interface communicatively coupled to the at least one processor; and
   memory storing computer-readable instructions that, when executed by the at least one processor, cause the system to:
      receive, via the communication interface, and from an interactive voice response server, an inbound call notification associated with a telephone call received by the interactive voice response server from a mobile device;
      determine a device identifier of the mobile device;
      determine a customer identifier corresponding to a user of the mobile device;
      load a customer authentication profile based on the customer identifier;
      generate a biometric authentication prompt for authenticating the user of the mobile device;
      cause the biometric authentication prompt to be sent to the mobile device;
      receive, via the communication interface, and from the mobile device, a validation message;
      in response to receiving the validation message, generate an authentication message; and
      send, via the communication interface, and to the interactive voice response server, the authentication message.

2. The system of claim 1, wherein the customer identifier identifies the user of the mobile device as a customer of an organization operating the system.

3. The system of claim 1, wherein the customer authentication profile includes information indicating that the user of the mobile device has registered the mobile device to receive biometric authentication prompts.

4. The system of claim 1, wherein the customer authentication profile includes information indicating that the mobile device stores one or more predefined biometric credentials.

5. The system of claim 1, wherein causing the biometric authentication prompt to be sent to the mobile device comprises causing a push notification service to send a push notification to the mobile device.

6. The system of claim 1, wherein the biometric authentication prompt is configured to prompt the user of the mobile device to provide biometric input for verification by the mobile device.

7. The system of claim 1, wherein the validation message indicates that the user of the mobile device has provided valid biometric input matching one or more predefined biometric credentials stored by the mobile device.

8. The system of claim 1, wherein the authentication message establishes an authentication status of the user of the mobile device.

9. The system of claim 1, wherein the authentication message is configured to cause the interactive voice response server to provide the user of the mobile device with access to account information that is specific to the user of the mobile device.

10. The system of claim 1, wherein the memory stores additional computer-readable instructions that, when executed by the at least one processor, further cause the system to:
   after sending the authentication message, receive, via the communication interface, and from the interactive voice response server, a transaction request; and
   process the transaction request.

11. The system of claim 10, wherein processing the transaction request comprises causing one or more systems operated by a financial institution to execute a funds transfer transaction.

12. The system of claim 6, wherein the biometric input comprises fingerprint biometric input.

13. A method, comprising:
   at a computing platform comprising at least one processor, memory, and a communication interface:
      receiving, by the at least one processor, via the communication interface, and from an interactive voice response server, an inbound call notification associated with a telephone call received by the interactive voice response server from a mobile device;
      determining, by the at least one processor, a device identifier of the mobile device;
      determining, by the at least one processor, a customer identifier corresponding to a user of the mobile device;
      loading, by the at least one processor, a customer authentication profile based on the customer identifier;
      generating, by the at least one processor, a biometric authentication prompt for authenticating the user of the mobile device;
      causing, by the at least one processor, the biometric authentication prompt to be sent to the mobile device;
      receiving, by the at least one processor, via the communication interface, and from the mobile device, a validation message;
      in response to receiving the validation message, generating, by the at least one processor, an authentication message; and
      sending, by the at least one processor, via the communication interface, and to the interactive voice response server, the authentication message.

14. The method of claim 13, wherein the customer identifier identifies the user of the mobile device as a customer of an organization operating the computing platform.

15. The method of claim 13, wherein the customer authentication profile includes information indicating that the user of the mobile device has registered the mobile device to receive biometric authentication prompts.

16. The method of claim 13, wherein the customer authentication profile includes information indicating that the mobile device stores one or more predefined biometric credentials.

17. The method of claim 13, wherein causing the biometric authentication prompt to be sent to the mobile device comprises causing a push notification service to send a push notification to the mobile device.

18. The method of claim 13, wherein the biometric authentication prompt is configured to prompt the user of the mobile device to provide biometric input for verification by the mobile device.

19. The method of claim 18, wherein the biometric input comprises fingerprint biometric input.

20. One or more non-transitory computer-readable media storing instructions that, when executed by a computing platform comprising at least one processor, memory, and a communication interface, cause the computing platform to:

receive, via the communication interface, and from an interactive voice response server, an inbound call notification associated with a telephone call received by the interactive voice response server from a mobile device;

determine a device identifier of the mobile device;

determine a customer identifier corresponding to a user of the mobile device;

load a customer authentication profile based on the customer identifier;

generate a biometric authentication prompt for authenticating the user of the mobile device;

cause the biometric authentication prompt to be sent to the mobile device;

receive, via the communication interface, and from the mobile device, a validation message;

in response to receiving the validation message, generate an authentication message; and send, via the communication interface, and to the interactive voice response server, the authentication message.

* * * * *